United States Patent
Li et al.

(10) Patent No.: US 11,144,459 B2
(45) Date of Patent: Oct. 12, 2021

(54) CACHE COHERENCY ADOPTED GPU SHARED MEMORY

(71) Applicant: International Business Machines Corporation, Armonk, NY (US)

(72) Inventors: Zhichao Li, Austin, TX (US); Li Li, Cedar Park, TX (US); Riaz Y. Hussain, Austin, TX (US); Ben Gibbs, Pflugerville, TX (US); Su Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 16/130,769

(22) Filed: Sep. 13, 2018

(65) Prior Publication Data
US 2020/0089613 A1  Mar. 19, 2020

(51) Int. Cl.
| | |
|---|---|
| *G06F 12/0831* | (2016.01) |
| *G06T 1/60* | (2006.01) |
| *G06T 1/20* | (2006.01) |
| *G06F 9/38* | (2018.01) |
| *G06F 12/084* | (2016.01) |

(52) U.S. Cl.
CPC ........ *G06F 12/0835* (2013.01); *G06F 9/3877* (2013.01); *G06F 9/3891* (2013.01); *G06F 12/084* (2013.01); *G06T 1/20* (2013.01); *G06T 1/60* (2013.01); *G06F 2212/621* (2013.01)

(58) Field of Classification Search
USPC ...................................................... 711/141
See application file for complete search history.

(56) References Cited

U.S. PATENT DOCUMENTS

| | | | |
|---|---|---|---|
| 9,244,851 B2 | 1/2016 | Ambroladze et al. | |
| 9,274,960 B2 | 3/2016 | Kaxiras et al. | |
| 9,384,133 B2 | 7/2016 | Gschwind | |
| 9,720,662 B2 | 8/2017 | Gschwind et al. | |
| 10,062,429 B1* | 8/2018 | Borole | G06F 9/30123 |
| 10,325,343 B1* | 6/2019 | Zhao | G06F 11/3452 |
| 2011/0055838 A1* | 3/2011 | Moyes | G06F 9/4881 |
| | | | 718/102 |
| 2011/0231612 A1 | 9/2011 | Karlsson et al. | |
| 2011/0252202 A1 | 10/2011 | Heine et al. | |
| 2017/0168939 A1* | 6/2017 | Jalal | G06F 12/0833 |
| 2018/0293758 A1* | 10/2018 | Bar-On | G06N 3/0481 |
| 2018/0314638 A1* | 11/2018 | LeBeane | G06F 12/0813 |

OTHER PUBLICATIONS

Stehle, Elias, and Hans-Arno Jacobsen. "A Memory Bandwidth-Efficient Hybrid Radix Sort on GPUs" Sigmoid '17 Proceedings of the 2017 ACM International Conference on Management of Data, pp. 417-432, May 14-19, 2017 (Year: 2017).*

(Continued)

*Primary Examiner* — Michael Krofcheck
*Assistant Examiner* — John Francis Wojton
(74) *Attorney, Agent, or Firm* — VanLeeuwen & VanLeeuwen; David M. Quinn (57) ABSTRACT

An approach is provided in which a system includes a GPU cluster. The GPU cluster includes multiple GPU nodes, that each includes a GPU core and a corresponding local cache. The GPU cluster also includes a shared memory and an internal bus that maintains cache coherency between the shared memory and the local caches included in the GPU nodes.

17 Claims, 9 Drawing Sheets

(56) References Cited

OTHER PUBLICATIONS

Yin Jianxong, "Build GPU Cluster HW for Efficiently Accelerating CNN Training," Nanyang Technological University, Rapid-Rich Object Search Lab, 2016, 33 pages.
Walker, "Exploring the Complexities of PCIe Connectivity and Peer-to-Peer Communication," Exxact Corp., Apr. 2016, 12 pages.
Dinh et al., Graphics Processing Unit (GPU) Memory Hierarchy, Rochester Institute of Technology, 2015, 24 pages.
Dalyrymple, "GPU Memory," Class 602 Lecture Notes, Johns Hopkins Whiting School of Engineering, 2014, 19 pages.

\* cited by examiner

CACHE COHERENCY ADOPTED GPU SHARED MEMORY

BACKGROUND

PCI (Peripheral Component Interconnect) or PCI-Express (PCIe) is an expansion bus used in modern computers for communication between a host central processing unit (CPU) and peripheral devices. Graphics processing units (GPUs) are becoming popular peripheral devices due to their parallel processing architecture and High-Performance Computing (HPC) capabilities. As the number of GPUs per system increases, Peer-to-Peer (P2P) high speed data buses are becoming a preferred bus to connect the CPU to the GPUs, and GPUs to GPUs (GPU pairs), to avoid the PCIe overhead and ultimately deliver a higher bandwidth between the CPU and GPUs.

As device technology advances and market expectations increase, higher overall computer performance is required, such as in cognitive computing and artificial intelligence that requires deep neural network training. In turn, systems require an increased amount of GPUs, which results in an increased amount of P2P high speed data buses.

Unfortunately, existing system architectures require one P2P high speed bus connection between each GPU pair, which equates to n*(n−1)/2 P2P high speed buses (n=# of cores). As such, four GPUs require eight P2P high speed buses, and 16 GPUs require 120 P2P high speed buses. In short, the amount of P2P high speed buses increases quadratically as the amount of GPUs increase.

Due to area and power constraints, today's technology cannot support the large number of P2P high speed busses required in large GPU count systems. As such, existing systems architectures use lower performance buses to connect the GPU pairs, which become bottlenecks during peak performance periods.

BRIEF SUMMARY

According to one embodiment of the present disclosure, an approach is provided in which a system includes a GPU cluster. The GPU cluster includes multiple GPU nodes, that each includes a GPU core and a corresponding local cache. The GPU cluster also includes a shared memory and an internal bus that maintains cache coherency between the shared memory and the local caches included in the GPU nodes.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
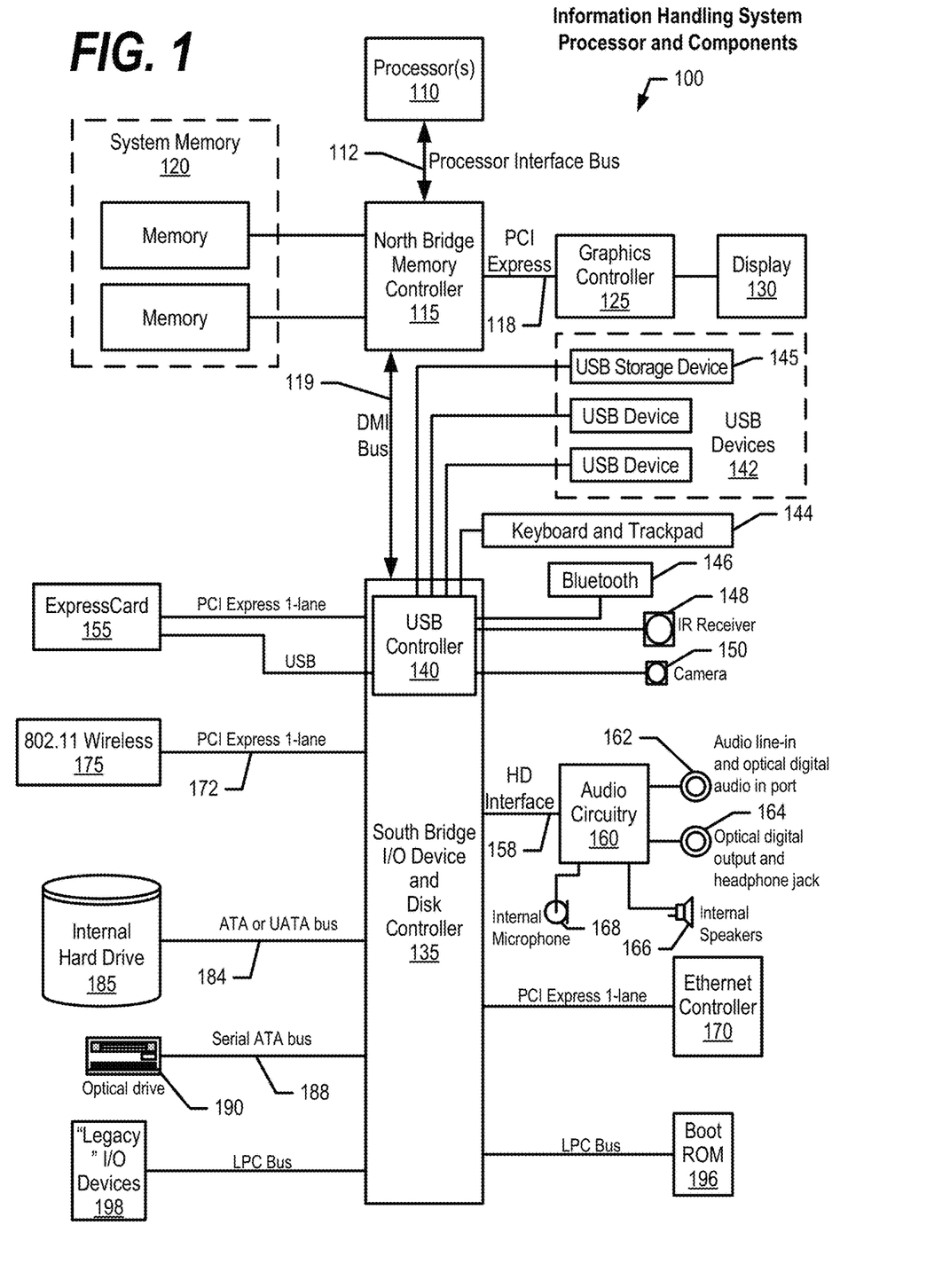
FIG. 1 is a block diagram of a data processing system in which the methods described herein can be implemented.

FIG. 1 illustrates information handling system 100, which is a simplified example of a computer system capable of performing the computing operations described herein. In one embodiment, information handling system 100 utilizes design tools to design, simulate, layout, and fabricate the systems shown in FIGS. 3 through 5. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
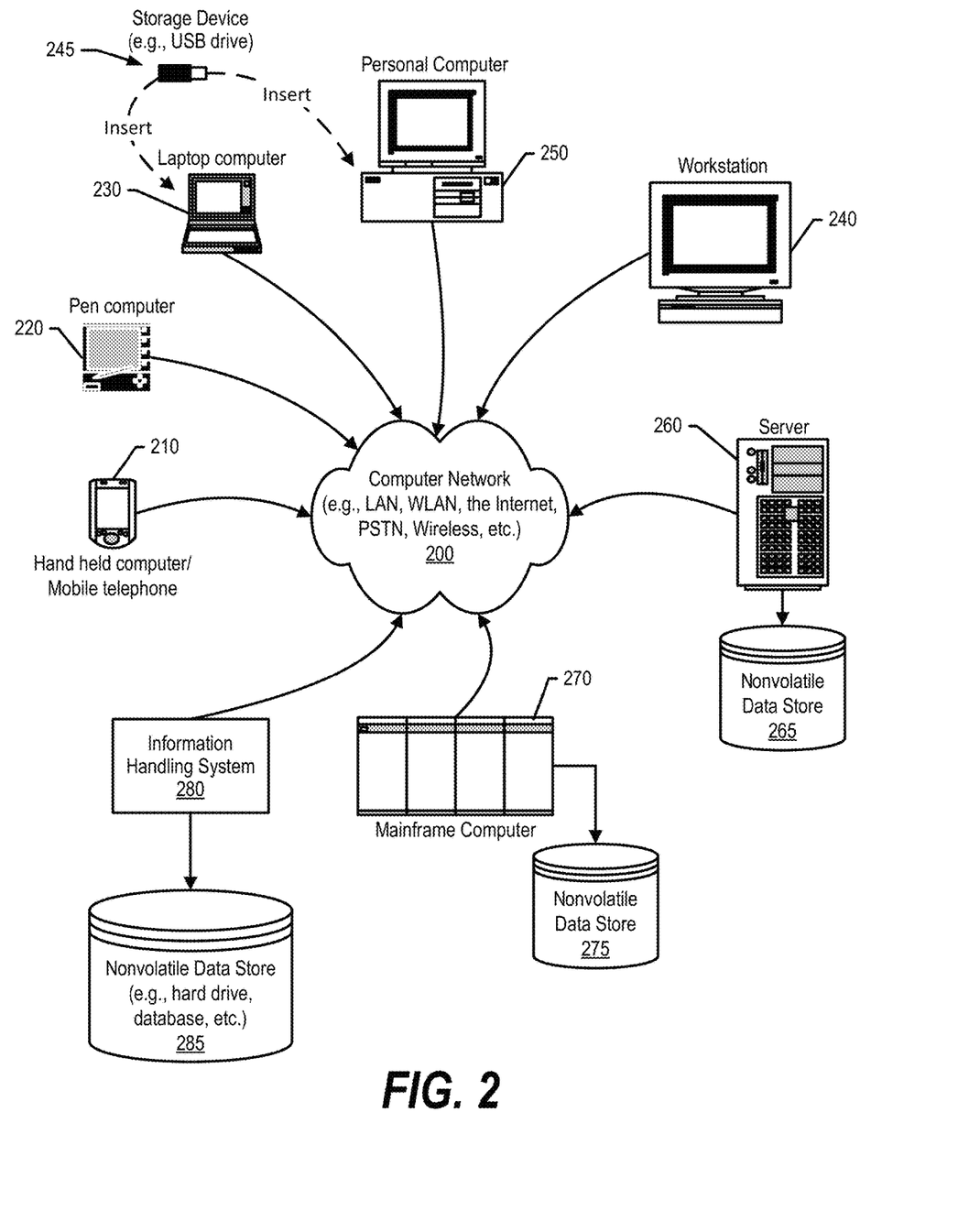
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, today's systems are forced to utilize lower bandwidth P2P data buses in large GPU count designs. In an embodiment where a P2P high speed data bus operates at 80 GB/s, a three GPU core system typically uses 40 GB/s P2P data buses due to space and power constraints. In another embodiment, a direct P2P connection does not exist between some GPU pairs and, as such, data hops multiple times across several links before reaching destinations and reduces overall system performance.

FIGS. 3 through 9 disclose a linearly scalable method and system architecture to resolve high GPU core count architectures. As discussed herein, a GPU cluster includes multiple GPU nodes (e.g., four nodes) that each include a GPU core and a local cache. Each GPU cluster also includes an additional layer of shared memory that is shared among the GPU cluster's multiple GPU nodes. The shared memory and local caches maintain cache coherency through a cache coherency bus that, as defined herein, is a bus that utilizes a cache coherency protocol, such as MOESI (Modified Owned Shared Invalid), MERSI (Modified Exclusive Recent Shared Invalid), MESIF (Modified Exclusive Shared Invalid Forward), and etcetera. When a first GPU sends data to a second GPU in the same GPU cluster, the first GPU stores the data in its local cache, which then is copied to the shared memory via cache coherency. In turn, the data from the shared memory copies to the second GPU's local cache via cache coherency for the second GPU core to access.

When additional GPU clusters (each including four nodes) are added to the system architecture, the high speed data bus requirement increases linearly instead of quadratically increasing per previous architectures because in part, of the GPU cluster's shared memory. As a result, the number of GPU nodes that are added to a design is highly scalable. In addition, the GPU P2P bandwidth capability between the GPU nodes remains high, which is also different from previous architectures where the bandwidth decreases as the number of GPUs increases. At least because of these advantages, the method and system discussed herein are highly applicable to a cognitive design, in one embodiment, because more analysis and neural training requires higher P2P bandwidth and more available GPU nodes.

Figure 3:
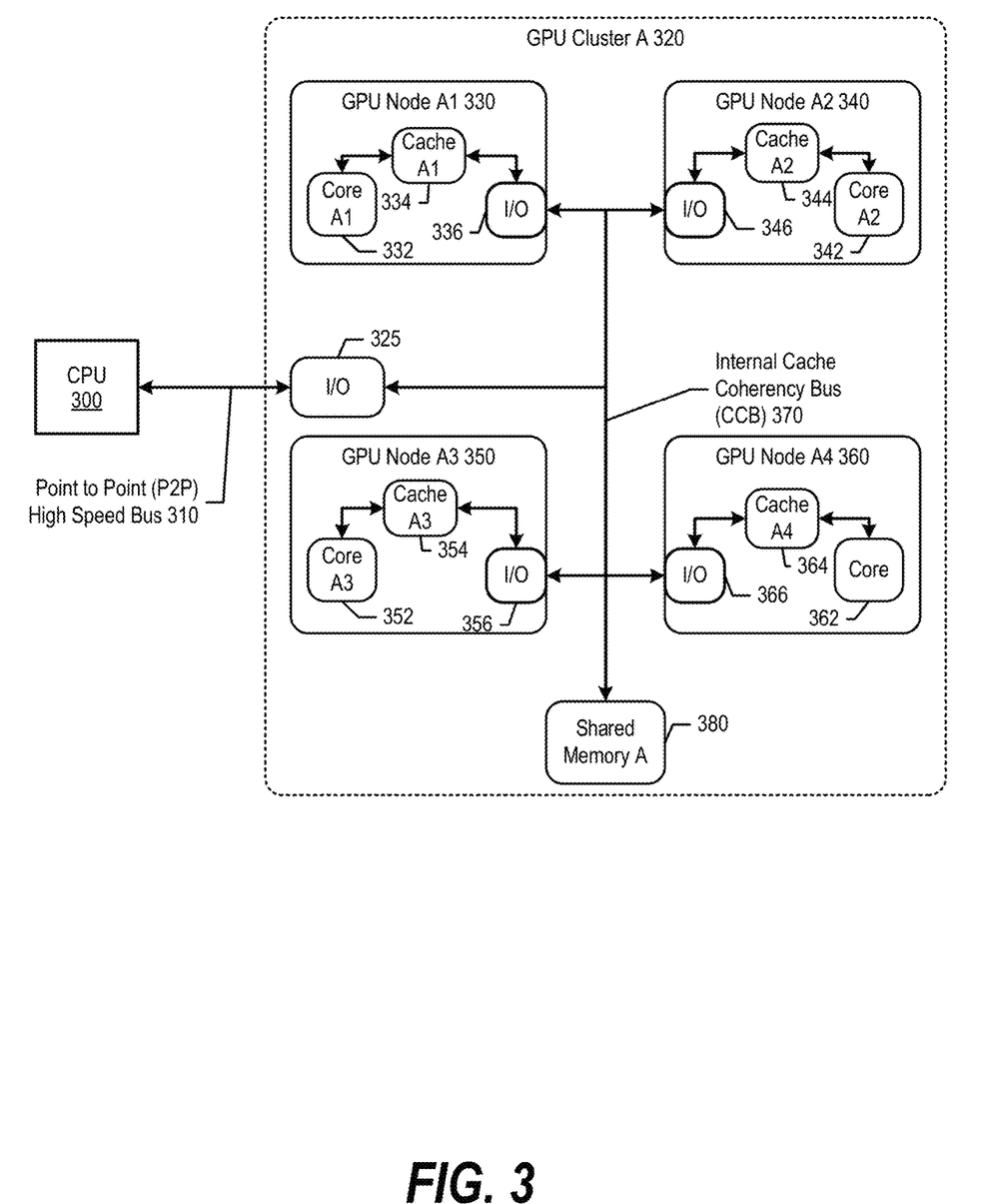
FIG. 3 is a diagram depicting an exemplary system that includes a CPU and a GPU cluster.

FIG. 3 is a diagram depicting an exemplary system that includes a CPU and a GPU cluster. Host CPU 300 interfaces to GPU cluster A 320 through I/O 325 via point to point high speed bus (P2PHSB) 310. P2PHSB 310 supports high data rate transfers (e.g., 80 GB/s or higher) between two points, such as an NVLink™ bus. GPU cluster A 320's GPU nodes are peripherals to host CPU 300.

GPU cluster A 320 includes shared memory A 380 and four GPU nodes 330, 340, 350, and 360. GPU node A1 330 includes core A1 332, local cache A1 334, and I/O 336. GPU node A2 340 includes core A2 342, local cache A2 344, and I/O 346. GPU node A3 350 includes core A3 352, local cache A3 354, and I/O 356. And, GPU node A4 360 includes core A4 362, local cache A4 364, and I/O 366. As can be seen in FIG. 3, each of the local caches are dedicated to their respective GPU core.

As discussed in more detail below and shown in FIG. 6, CPU 300 sends instructions/data over P2PHSB 310 to I/O 325, and over internal cache coherency bus (CCB) 370 to shared memory A 380. In turn, the instructions/data are copied to the appropriate local cache A1 334, A2 344, A3 354, or A4 364 via a cache coherency protocol.

In one embodiment, radix table translation is used in conjunction with cache and a TLB (translation lookaside buffer) to increase the number of cores per node. Radix table translation is an approach of managing memory page tables to enable effective address translation. Using a radix page table pointer to point to a hierarchy of translation tables, the effective portion of a linear address is obtained to access a block of memory. In this embodiment, when overall speed is limited by the data transfer within a node, or due to limited bus interfaces for a GPU adapter to connect on a computer, radix table translation is used to save data transfer time when a TLB hit occurs. As a result, more cores are implemented within a node without impacting the overall performance.

Figure 4:
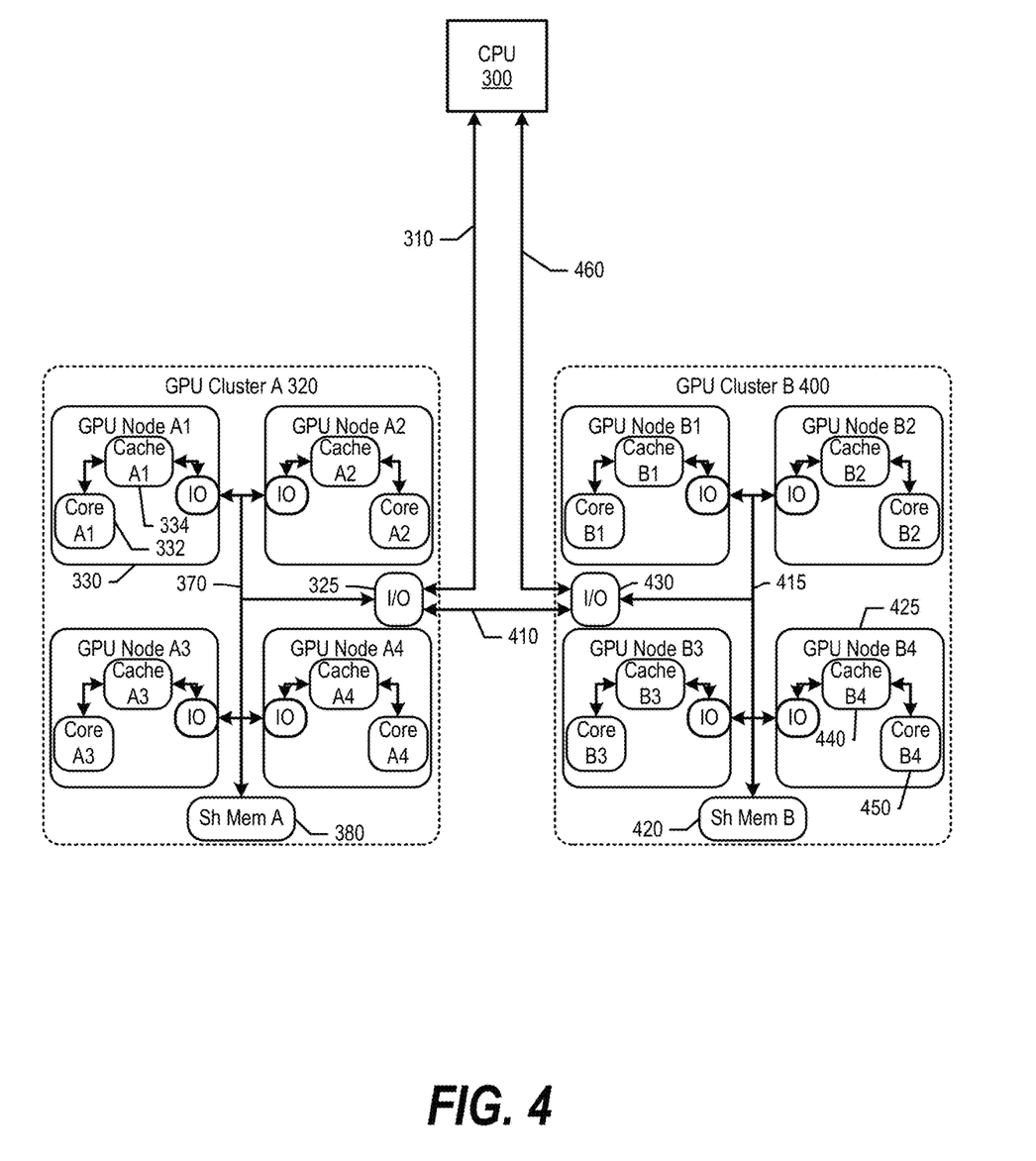
FIG. 4 is a diagram depicting an exemplary system that includes a CPU and two GPU clusters.

FIG. 4 is a diagram depicting an exemplary system that includes a CPU and two GPU clusters. Compared to the system shown in FIG. 3 that includes four GPU nodes and requires one point to point high speed data bus, the system shown in FIG. 4 includes eight GPU nodes (adds GPU cluster B 400) and only requires three point to point high speed data buses 310, 410, and 460. As such, the system in FIG. 4 adds four GPU nodes but only requires two additional point to point high speed data buses.

As discussed in more detail below and shown in FIG. 7, when GPU cluster A 320's core A1 332 wishes to send instructions/data to GPU cluster B 400's core B4 450 (in GPU node B4 425), core A1 332 stores the instructions/data in its local cache A1 334, which is copied to shared memory A 380 via cache coherency. Then, the instructions/data pass through P2PHSB 410 to shared memory B 420.

In one embodiment, P2PHSB 410 uses a high-speed bus protocol to transfer data between GPU clusters. In this embodiment, shared memory A 380 pushes the data to IO 325 (for buffering) and sends a request to GPU cluster B 400 for data transfer per high-speed bus protocol. I/O 430 then acknowledges the request and receives the data, which it sends to shared memory B 420. In another embodiment, P2PHSB 410 is also using cache coherency. In this embodiment, data from one of GPU cluster A 320's node's local cache is copied to shared memory A 380 and is also sent directly to shared memory B 420.

Once the instructions/data reside in shared memory B 420, the instructions/data are copied from shared memory B 420 to local cache B4 440 over internal cache coherency bus 415. In turn, core B4 450 accesses the instructions/data from local cache B4 440.

Figure 5:
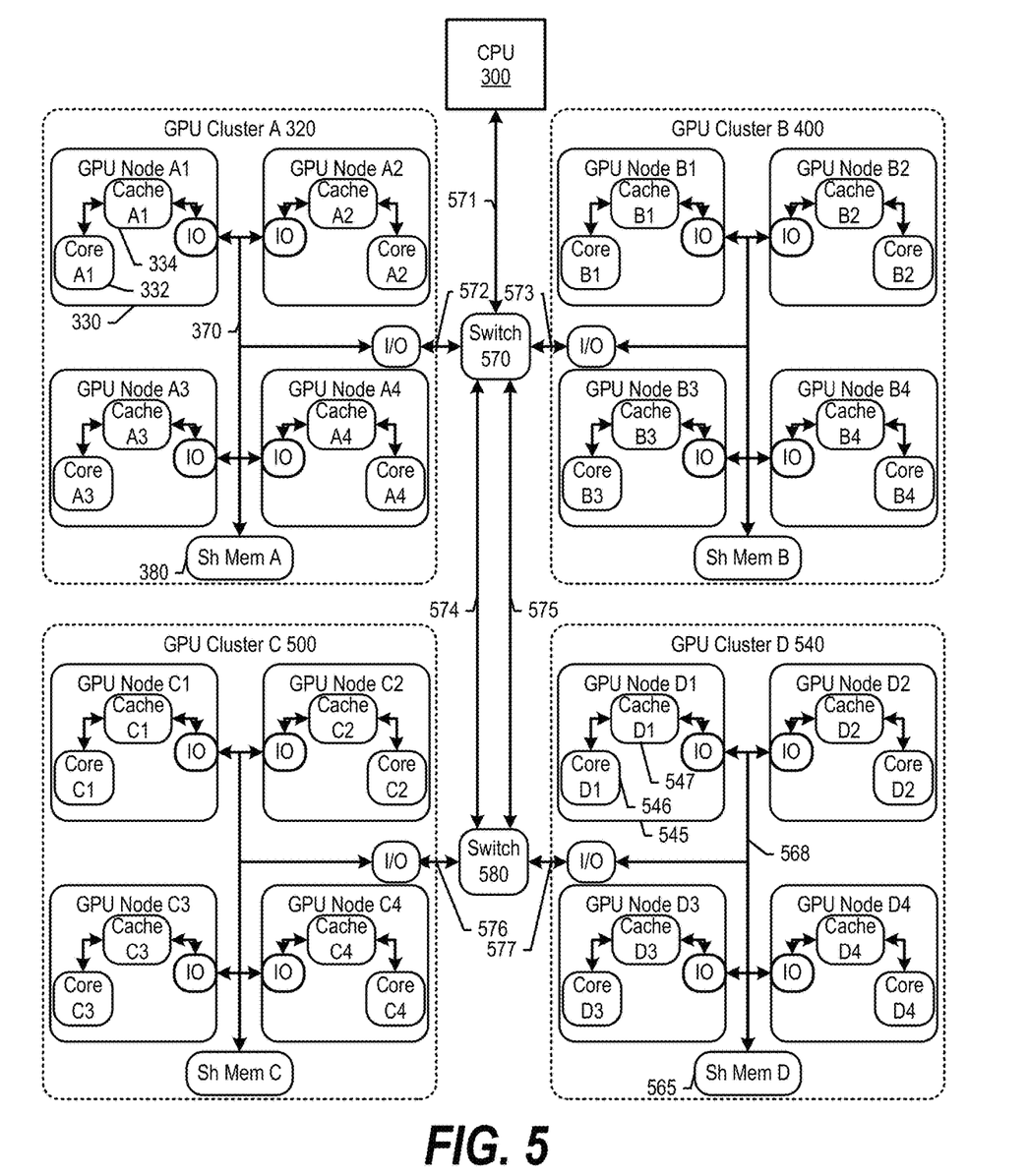
FIG. 5 is a diagram depicting an exemplary system that includes a CPU and four GPU clusters.

FIG. 5 is a diagram depicting an exemplary system that includes a CPU and four GPU clusters. The system shown in FIG. 5 includes sixteen GPU nodes (adds GPU cluster C 500 and GPU cluster D 540), requires two high speed switches 570, 580, and seven point to point high speed data buses 571, 572, 573, 574, 575, 576, and 577. As such, the system in FIG. 5 relative to the system in FIG. 4 adds eight additional GPU nodes but only adds four additional point to point high speed data buses.

As discussed in more detail below and shown in FIG. 8, when GPU cluster A 320's core A1 332 wishes to send instructions/data to GPU cluster D 540's GPU node D1 545, core A1 332 stores the instructions/data in its local cache A1 334, which is copied to shared memory A 380 via cache coherency. Then, the data passes through P2PHSB 572, switch 570, P2PHSB 574/575, switch 580, P2PHSB 577, and to shared memory D 565. Next, the instructions/data are copied from shared memory D 565 to local cache D1 547 via internal cache coherency bus 568. In turn, core D1 546 accesses the instructions/data from local cache D1 547.

Figure 6:
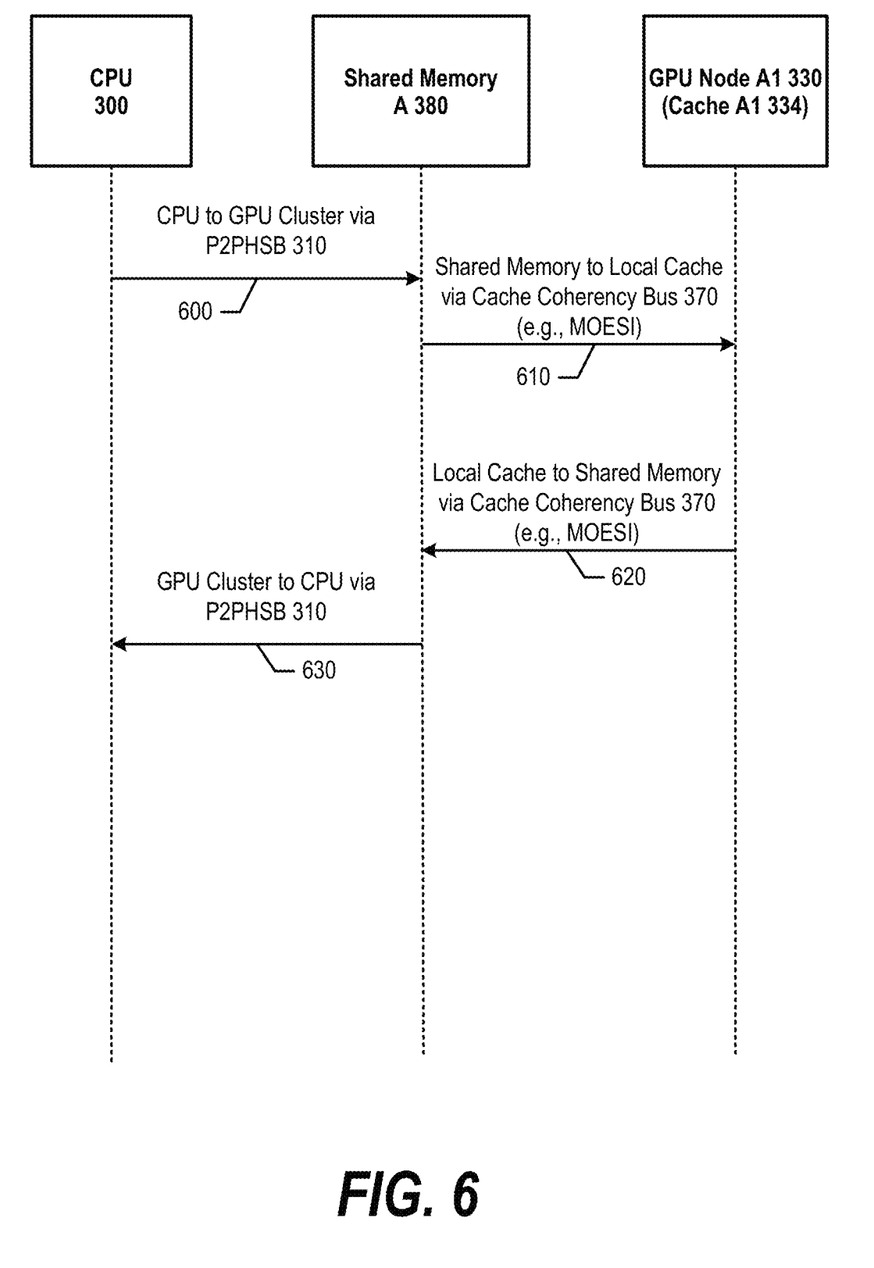
FIG. 6 is an exemplary diagram showing instruction/data flow between a CPU and a GPU node, such as in the system shown in FIG. 3.

FIG. 6 is an exemplary diagram showing instruction/data flow between CPU 300 and GPU node A1 330, such as in the system shown in FIG. 3. At 600, CPU 300 sends instructions/data over P2PHSB 310 to I/O 325 and to GPU cluster A 320's shared memory A 380. Next, at 610, internal CCB 370 with its cache coherency protocol, copies the instruction/data to cache A1 334, which is GPU node A1 330's local cache. At this point, core A1 332 accesses the data accordingly.

When core A1 332 wishes to send instructions/data to CPU 330, core A1 332 stores the instructions/data in its local cache A1 334. Then, at 620, the instructions/cache copies to shared memory A 380 over internal CCB 370 via cache coherency. Then, at 630, the instructions/data are sent to CPU 300 over P2PHSB 310 for further processing.

Figure 7:
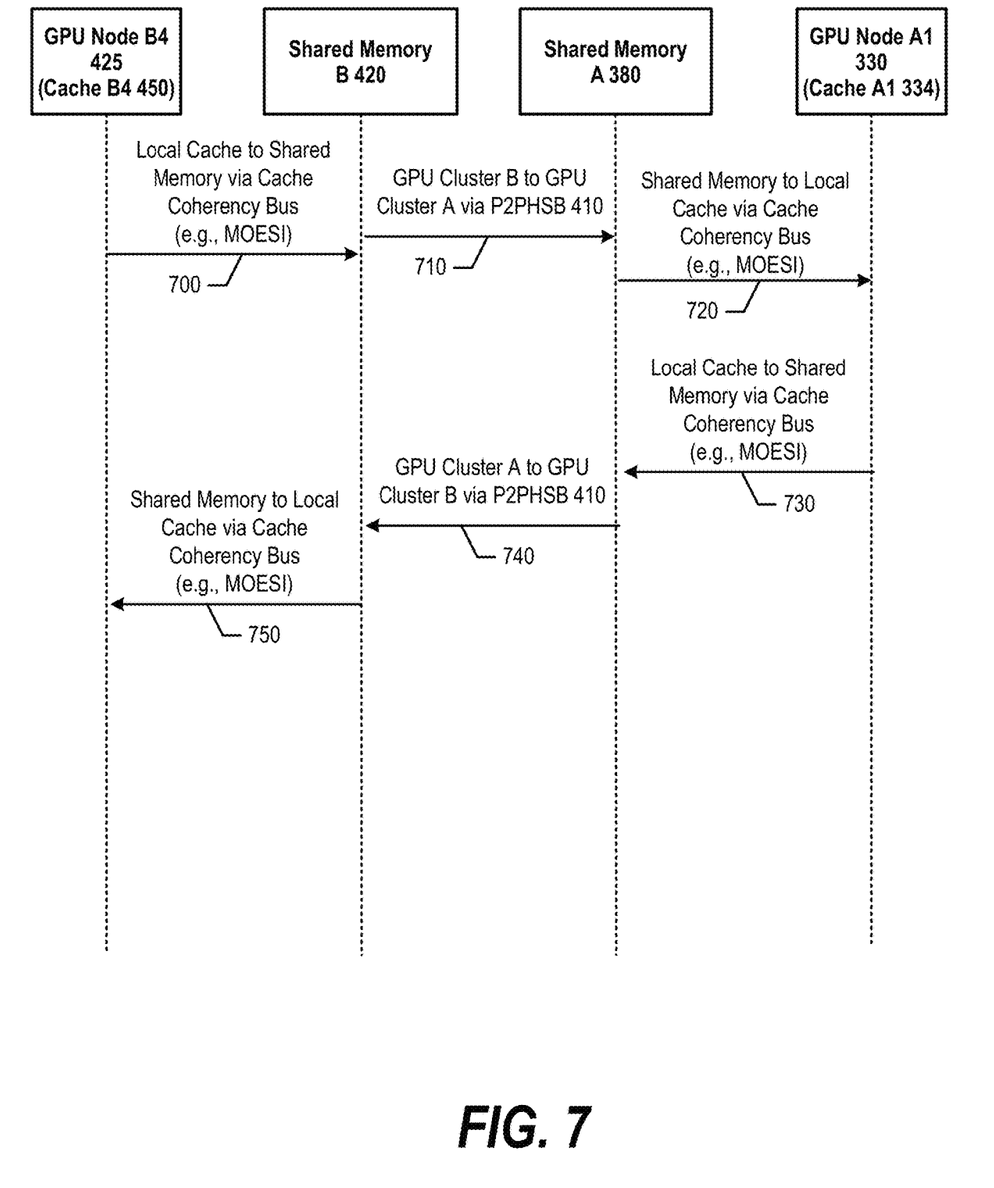
FIG. 7 is an exemplary diagram showing instruction/data flow between a GPU node and another GPU node, such as in the system shown in FIG. 4.

FIG. 7 is an exemplary diagram showing instruction/data flow between GPU node B4 425 and GPU node A1 330, such as in the system shown in FIG. 4. When core B4 450 wishes to send instructions/data to GPU node A1 330, core B4 450 stores the instructions/data in its local cache B4 440. Then, at 700, the instructions/data copies to shared memory B 420 via cache coherency. At 710, the data passes from shared memory B 420 over P2PHSB 410 to shared memory A 380. At 720, the instruction/data copies from shared memory A 380 to local cache A1 334. At this point, core A1 332 accesses the instructions/data in local cache A1 334.

When core A1 332 wishes to send instructions/data to GPU node B4 425, core A1 332 stores the instructions/data in its local cache A1 334. Then, at 730, the instruction/data copies to shared memory A 380 over internal CCB 370 via cache coherency. Then, at 740, the data passes from shared memory A 380 over P2PHSB 410 to shared memory B 420. At 750, the instructions/data are copied into local cache B4 440 via cache coherency. At this point, core B4 450 accesses the instructions/data in local cache B4 440.

Figure 8:
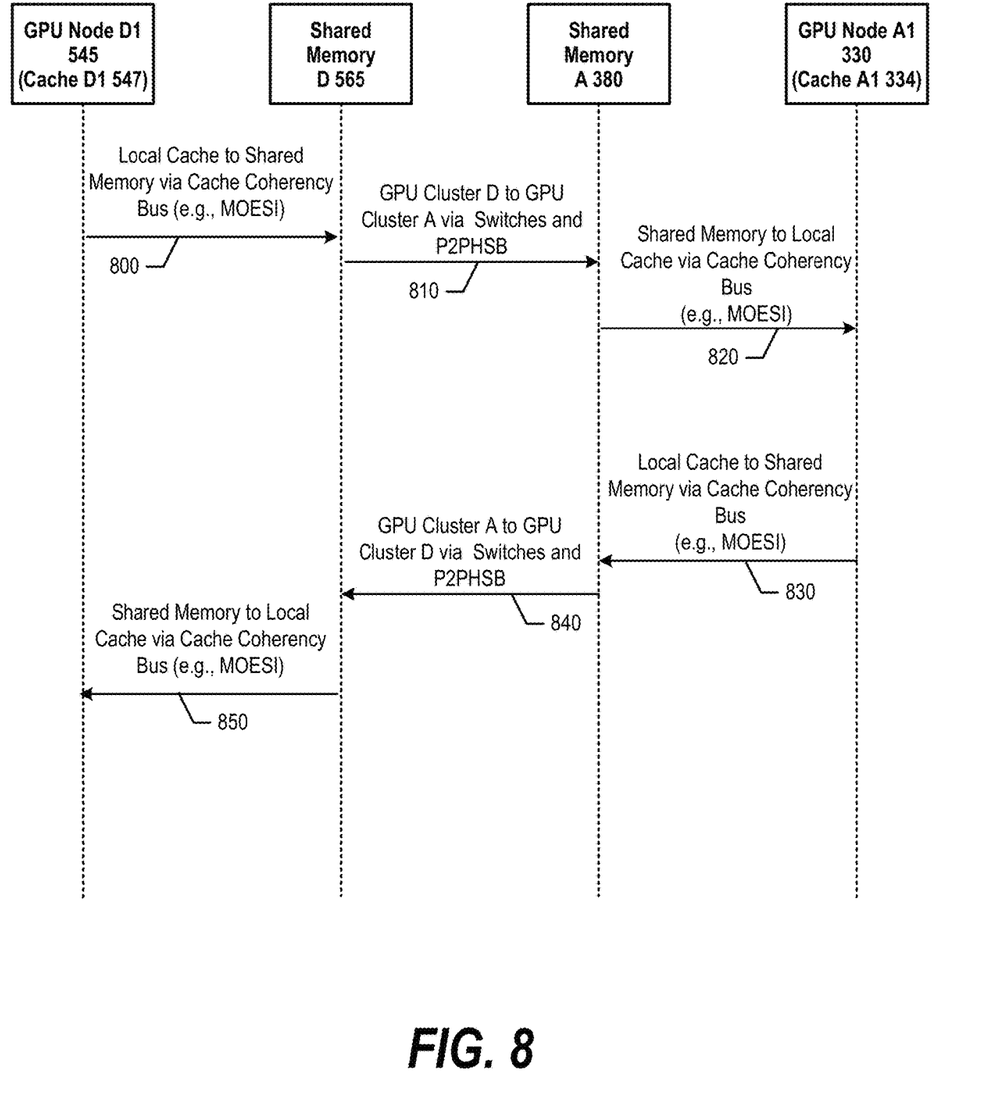
FIG. 8 is an exemplary diagram showing instruction/data flow between a GPU node and another GPU node, such as in the system shown in FIG. 5.

FIG. 8 is an exemplary diagram showing instruction/data flow between GPU node D1 545 and GPU node A1 330, such as in the system shown in FIG. 5. When core D1 546 wishes to send instructions/data to GPU node A1 330, core D1 546 stores the instructions/data in its local cache D1 547. Then, at 800, the instructions/data are copied to shared memory D 565 via cache coherency over internal CCB 568. At 810, the data passes from shared memory D 565 through P2PHSB 577, switch 580, P2PHSB 575, switch 570, P2PHSB 572, and to shared memory A 380. At 820, the instructions/data are copied from shared memory A 380 to local cache A1 334 via cache coherency. At this point, core A1 332 accesses the instructions/data in local cache A1 334.

When core A1 332 wishes to send instructions/data to GPU node D1 545, core A1 332 stores the instructions/data in its local cache A1 334. Then, at 830, the instructions/cache are copied to shared memory A 380 over internal CCB 370 via cache coherency. Then, at 840, the data passes from shared memory A 380 over various switches and P2PHSBs discussed above to shared memory D 565. At 850, the instructions/data are copied from shared memory D 565 into local cache D1 547 via cache coherency over internal CCB 568. At this point, core D1 546 accesses the instructions/data in local cache D1 547.

Figure 9:
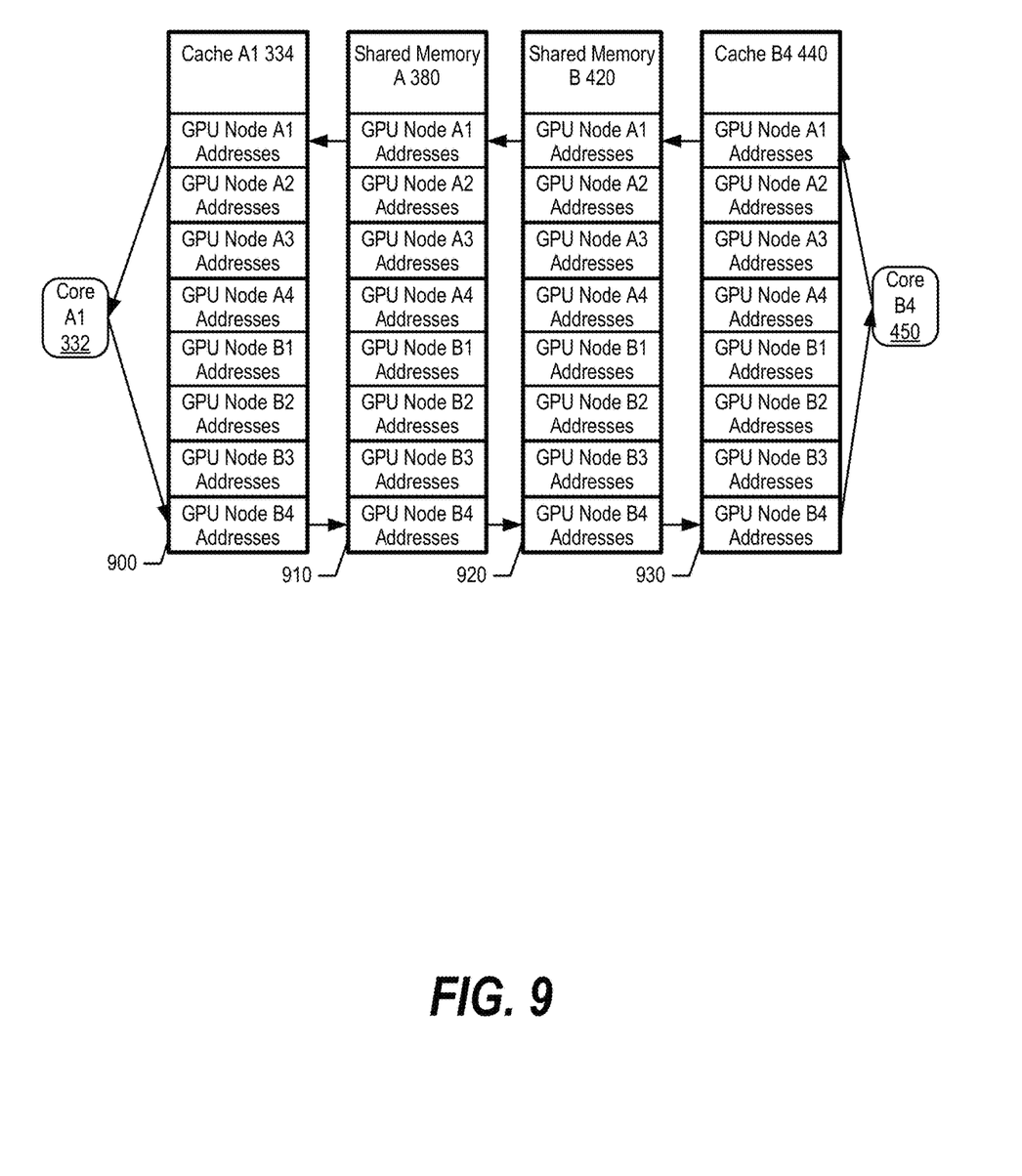
FIG. 9 is an exemplary diagram showing an approach of using cache coherency to pass instructions/data between GPU clusters and nodes.

FIG. 9 is an exemplary diagram showing an approach of using cache coherency to pass instructions/data between GPU clusters and nodes. Each of the local caches and shared memories have node "slots" where cores can store data for other cores and access data from other cores. FIG. 9 shows that when core A1 332 wishes to send data to core B4 450, core A1 332 stores the data in slot 900 in its local cache A1 334. The data copies to slot 910 in shared memory A 380 via cache coherency, and subsequently passes to slot 920 in shared memory B 420 as discussed above. The data then copy from slot 920 to slot 930 via cache coherency, and core B4 450 accesses the instructions/data from its local cache B4 440's slot 930.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A system comprising:
   a first processing layer comprising:
      a host central processing unit (CPU);
      a point to point (P2P) high speed bus coupled to the host CPU; and
   a graphics processing unit (GPU) cluster comprising a second processing layer, wherein the second processing layer further comprises:
      a plurality of GPU nodes, each of the plurality of GPU nodes consisting of a GPU core, a local I/O, and a local cache dedicated to the GPU core;
      a shared memory accessible by each of the plurality of GPU nodes;
      an internal bus that connects the shared memory in the GPU cluster to each of the local I/Os in the plurality of GPU nodes and maintains cache coherency between the shared memory and each of the local caches in each of the plurality of GPU nodes using a cache coherency protocol; and
      an input/output interface that connects the GPU cluster to the P2P high speed bus and also connects to the internal bus in the GPU cluster.

2. The system of claim 1 further comprising:
   a plurality GPU clusters that comprises the GPU cluster; and
   one or more different point to point (P2P) high speed buses that connect to the plurality of GPU clusters.

3. The system of 2 wherein the one or more different P2P high speed buses maintain cache coherency between the shared memory in the GPU cluster and a different shared memory in a different one of the plurality of GPU clusters.

4. The system of claim 3 wherein the one or more different P2P high speed buses copies a set of data from the shared memory to the different shared memory in the different GPU cluster via a cache coherency protocol, and wherein the different GPU cluster further comprises:
   a plurality of different GPU nodes, each of the plurality of different GPU nodes comprising at least one of a plurality of different GPU cores and a corresponding at least one of a plurality of different local caches; and
   a different internal bus that maintains cache coherency between the different shared memory and the plurality of different GPU nodes, wherein the different internal bus copies the set of data from the different shared memory to a selected one of the plurality of different local caches.

5. The system of claim 1 wherein the host central processing unit (CPU) transmits a set of data to the GPU cluster over the P2P high speed bus, and wherein the GPU cluster is to the host CPU.

6. The system of claim 2 wherein an amount of the one or more different P2P high speed buses increases linearly as an amount of the plurality of GPU nodes increases.

7. The system of claim 1 wherein the P2P high speed bus operates at a frequency greater than 80 GB/s.

8. The system of claim 1 wherein the GPU cluster employs a radix table translation to maintain the cache coherency.

9. A method implemented by an information handling system, the method comprising:
   sending a set of data from a host processor over a point to point (P2P) high speed bus to a graphics processing unit (GPU) cluster, wherein the information handling system comprises a first processing layer including the host processor, the P2P high speed bus, and the GPU cluster, and wherein the GPU cluster comprises a second processing layer including a plurality of GPU nodes, a shared memory accessible by each of the plurality of GPU nodes, an internal bus, and an input/output interface;
storing the set of data in a first local cache by a first GPU core, wherein the first GPU core and the first local cache are included in a third processing layer of a first one of the plurality of GPU nodes consisting of the first GPU core, the first local cache, and a first local I/O;
utilizing a cache coherency protocol to copy the set of data over the internal bus from the first local cache to the shared memory;
utilizing the cache coherency protocol to copy the set of data from the shared memory to a second one of the plurality of GPU nodes consisting of a second GPU core, a second local cache, and a second local I/O, wherein the second GPU node stores the set of data in the second local cache;
accessing, by a second GPU core included in the second GPU node, the set of data from the second local cache;
sending a different set of data over the point to point (P2P) high speed bus from the host CPU to an I/O interface in the GPU cluster, wherein the I/O interface transfers the different set of data to the shared memory over the internal bus;
utilizing the cache coherency protocol to copy the different set of data from the shared memory to the first local cache; and
accessing the different set of data from the first local cache by the first GPU core.

10. The method of claim 9 further comprising a different GPU cluster that comprises a plurality of different GPU nodes and a different shared memory, the method further comprising:
transferring the set of data over at least one different point to point (P2P) high speed bus from the shared memory to the different shared memory;
utilizing the cache coherency protocol to copy the set of data from the different shared memory to a third GPU node included in the set of different GPU nodes, wherein the third GPU node stores the set of data in a third local cache; and
accessing, by a third GPU core included in the third GPU node, the set of data from the third local cache.

11. The method of claim 10 wherein an amount of the one or more different P2P high speed buses increases linearly as an amount of the plurality of GPU nodes increases.

12. The method of claim 10 wherein the one or more different P2P high speed buses operate at a frequency greater than 80 GB/s.

13. The method of claim 9 wherein the GPU cluster employs a radix table translation to maintain the cache coherency.

14. An information handling system comprising:
one or more processors;
a memory coupled to at least one of the processors;
a set of computer program instructions stored in the memory and executed by at least one of the processors in order to perform actions of:
sending a set of data from a host processor over a point to point (P2P) high speed bus to a graphics processing unit (GPU) cluster, wherein the information handling system comprises a first processing layer including the host processor, the P2P high speed bus, and the GPU cluster, and wherein the GPU cluster comprises a second processing layer including a plurality of GPU nodes, a shared memory accessible by each of the plurality of GPU nodes, an internal bus, and an input/output interface;
storing the set of data in a first local cache by a first GPU core, wherein the first GPU core and the first local cache are included in a third processing layer of a first one of the plurality of GPU nodes consisting of the first GPU core, the first local cache, and a first local I/O;
utilizing a cache coherency protocol to copy the set of data over the internal bus from the first local cache to the shared memory;
utilizing the cache coherency protocol to copy the set of data from the shared memory to a second one of the plurality of GPU nodes consisting of a second GPU core, a second local cache, and a second local I/O, wherein the second GPU node stores the set of data in the second local cache;
accessing, by a second GPU core included in the second GPU node, the set of data from the second local cache;
sending a different set of data over the point to point (P2P) high speed bus from the host CPU to an I/O interface in the GPU cluster, wherein the I/O interface transfers the different set of data to the shared memory over the internal bus;
utilizing the cache coherency protocol to copy the different set of data from the shared memory to the first local cache; and
accessing the different set of data from the first local cache by the first GPU core.

15. The information handling system of claim 14 further comprising a different GPU cluster that comprises a plurality of different GPU nodes and a different shared memory, wherein the processors perform additional actions comprising:
transferring the set of data over at least one different point to point (P2P) high speed bus from the shared memory to the different shared memory;
utilizing the cache coherency protocol to copy the set of data from the different shared memory to a third GPU node included in the set of different GPU nodes, wherein the third GPU node stores the set of data in a third local cache; and
accessing, by a third GPU core included in the third GPU node, the set of data from the third local cache.

16. The information handling system of claim 15 wherein an amount of the one or more different P2P high speed buses increases linearly as an amount of the plurality of GPU nodes increases.

17. The information handling system of claim 15 wherein the one or more different P2P high speed buses operate at a frequency greater than 80 GB/s.

* * * * *